(12) United States Patent
Kang

(10) Patent No.: US 7,757,382 B2
(45) Date of Patent: *Jul. 20, 2010

(54) BEARING POSITIONING TOOL SET

(76) Inventor: Hsin Fa Kang, P.O. Box 90, Tainan City 70499 (TW)

( * ) Notice: Subject to any disclaimer, the term of this patent is extended or adjusted under 35 U.S.C. 154(b) by 766 days.

This patent is subject to a terminal disclaimer.

(21) Appl. No.: 11/540,558

(22) Filed: Oct. 2, 2006

(65) Prior Publication Data

US 2008/0080095 A1    Apr. 3, 2008

(51) Int. Cl.
*B25B 27/14*    (2006.01)
(52) U.S. Cl. .............................. 29/724; 29/255; 29/263; 29/280; 29/271
(58) Field of Classification Search .................... 29/724, 29/271, 229, 235, 255, 263, 898.07, 898.09
See application file for complete search history.

(56) References Cited

U.S. PATENT DOCUMENTS

| | | | | | |
|---|---|---|---|---|---|
| 3,052,955 | A | * | 9/1962 | McAndrews et al. ...... | 29/898.07 |
| 3,249,986 | A | * | 5/1966 | Adkins .................... | 29/898.09 |
| 3,619,888 | A | * | 11/1971 | Tadashi ....................... | 29/718 |
| 4,182,011 | A | * | 1/1980 | Bretzger et al. .......... | 29/898.07 |
| 4,364,170 | A | * | 12/1982 | Ratliffe ....................... | 29/724 |
| 5,159,754 | A | * | 11/1992 | Vancsik .................... | 29/898.07 |
| 6,085,402 | A | * | 7/2000 | Hill, Jr. .................... | 29/402.03 |
| 6,886,228 | B1 | * | 5/2005 | Chen ........................... | 29/263 |
| 7,096,550 | B2 | * | 8/2006 | Klann ........................ | 29/227 |
| 7,478,464 | B2 | * | 1/2009 | Kang ......................... | 29/255 |
| 7,644,481 | B2 | * | 1/2010 | Kang .......................... | 29/271 |
| 2008/0282525 | A1 | * | 11/2008 | Kang .......................... | 29/271 |

\* cited by examiner

*Primary Examiner*—David P Bryant
*Assistant Examiner*—Ryan J Walters

(57) ABSTRACT

A bearing positioning tool set includes a grip having an inner end fixed with a combining rod with a combining hole. One or more positioning press blocks to be fitted with the grip are respectively formed with different diameters and bored with a central insert hole and respectively formed with a first fitting member, a first holding edge, a second fitting member and a second holding edge. A combining member is combined with the combining hole of a grip. By having the fitting member and the holding edge of the positioning press block respectively contacting closely with the inner wall and the upper edge of a bearing, hammering force can be applied evenly to position smoothly and quickly the bearing in the insert hole of an axle. Further, each positioning press block is formed with two different diameters for matching with different-sized bearings.

2 Claims, 6 Drawing Sheets

BEARING POSITIONING TOOL SET

BACKGROUND OF THE INVENTION

1. Field of the Invention

This invention relates to a bearing positioning tool set, particularly provided with positioning press blocks able to contact closely and smoothly with the upper inner edge of a bearing so that hammering force can be applied evenly to enable the bearing to be smoothly and quickly assembled and positioned in the insert hole of an axle. The tool set of this invention consists of a plurality of different-sized positioning press blocks respectively formed with two different diameters in order to match with different-sized bearings.

2. Description of the Prior Art

As commonly known, a bearing is an essential machine part for positioning an axle and reducing wear of the axle, so a bearing is one of the most important transmission machine parts. A conventional way of assembling a bearing, as shown in FIG. 1, is first to put a bearing (B) in the insert hole of an axle and then slightly hammer the upper side of the bearing (B) with a tool (C), or strike every upper corner of the bearing (B) to drive the bearing (B) into the insert hole of the axle with a hollow bar or a copper bar whose diameter is a little smaller than that of the bearing (B). However, assembling the bearing (B) in such conventional way may cause wear to the inner wall of the insert hole (A) of an axle because hammering force can hardly be applied evenly and hence the bearing (B) cannot be kept in a smooth and horizontal condition when being hammered. Thus, the bearing (B) cannot be closely fitted with the insert hole (A) of the axle and, as a result, the axle may produce noises when it is rotated, most likely to cause trouble to machine parts.

SUMMARY OF THE INVENTION

A first objective of this invention is to offer a bearing positioning tool set able to smoothly and quickly assemble and position a bearing in the insert hole of an axle.

A second objective of this invention is to offer a bearing positioning tool set able to have a positioning press block smoothly and closely contacting with the upper inner edge of a bearing so that hammering force can be applied evenly and the bearing, during assembling, can be kept smooth not to slant on one side, able to avoid wear to the inner wall of the insert hole of an axle and prevent the bearing from being damaged due to improper hammering.

A third objective of this invention is to offer a bearing positioning tool set, which is provided with various positioning press blocks with different sizes, and each positioning press block is formed with two different diameters for matching with different-sized bearings.

A fourth objective of this invention is to offer a bearing positioning tool set, which is provided with a tool box for facilitating depositing and storing members of the tool set.

The bearing positioning tool set in the present invention includes a grip, one or more positioning press blocks, a combining member and a toolbox. The grip has one end fixed with a combining rod with a combining hole. The positioning press blocks to be fitted with the grip are respectively formed with two different-sized diameters and bored with an insert hole in the center. Further, each positioning press block is formed with a first fitting member, a first holding edge, a second fitting member and a second holding edge. The combining member is threadably combined with the combining hole of the grip to fix the positioning press block in position.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
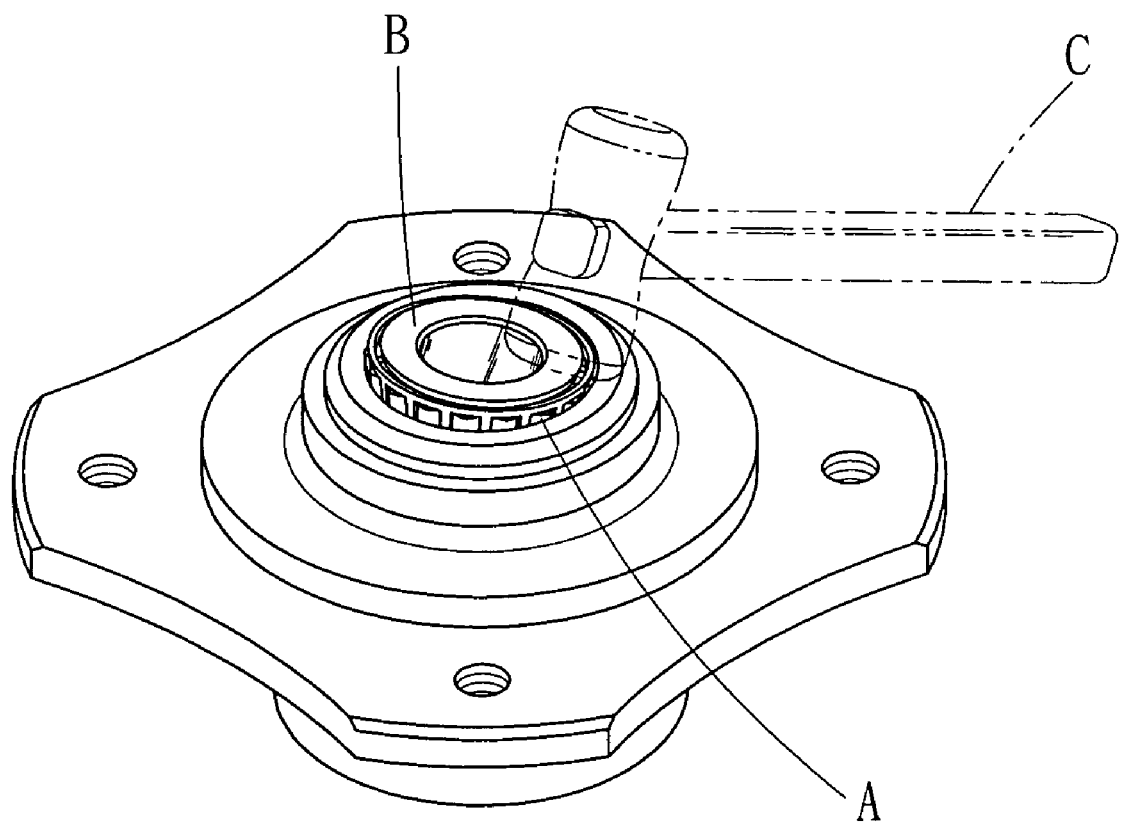
FIG. 1 is a perspective view of a bearing hammered to be assembled in the insert hole of an axle in a conventional way.
Figure 2:
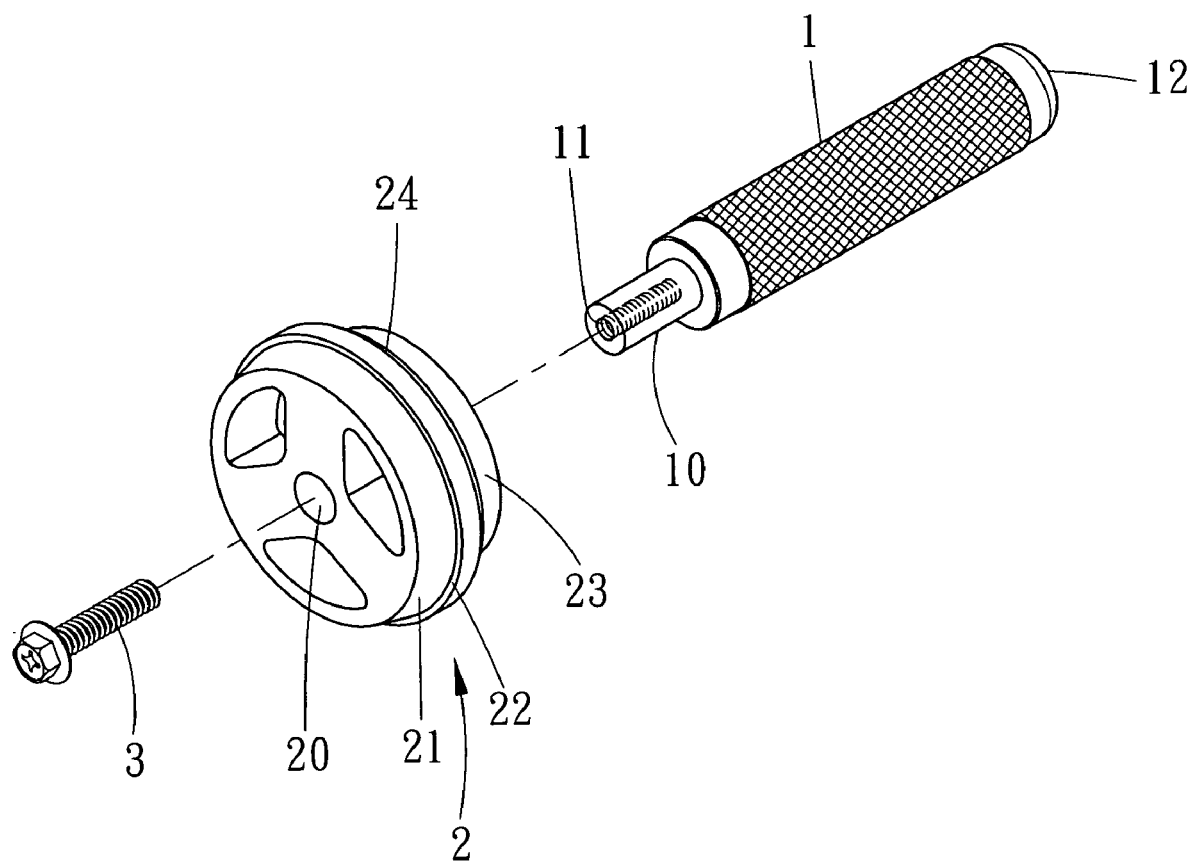
FIG. 2 is an exploded perspective view of a bearing-positioning tool set in the present invention.
Figure 3:
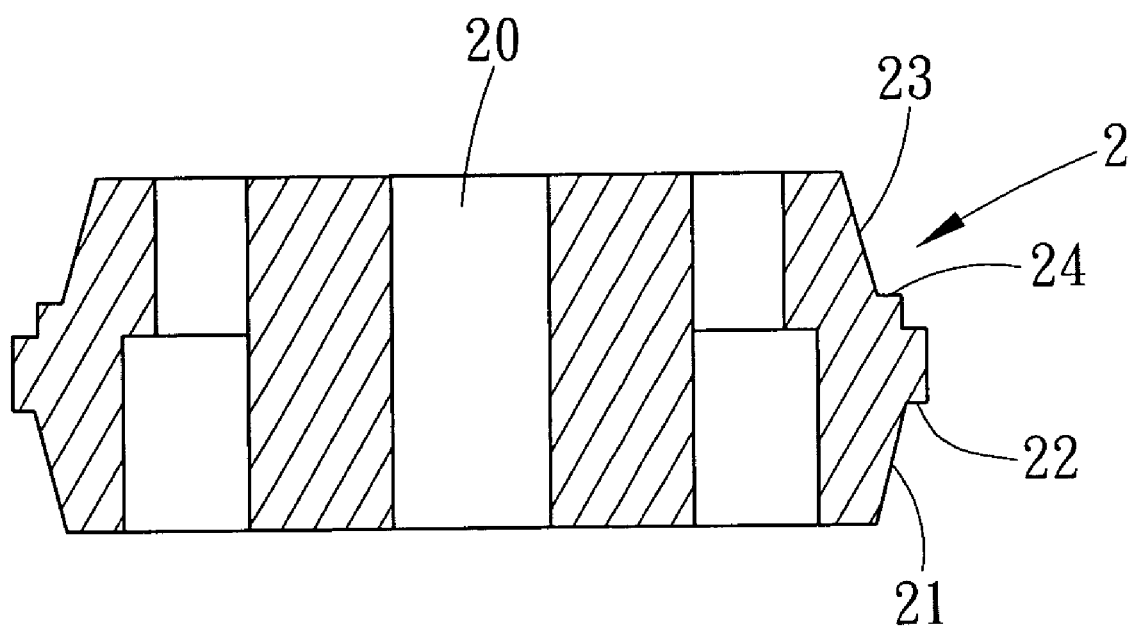
FIG. 3 is a cross-sectional view of a positioning press block in the present invention.
Figure 6:
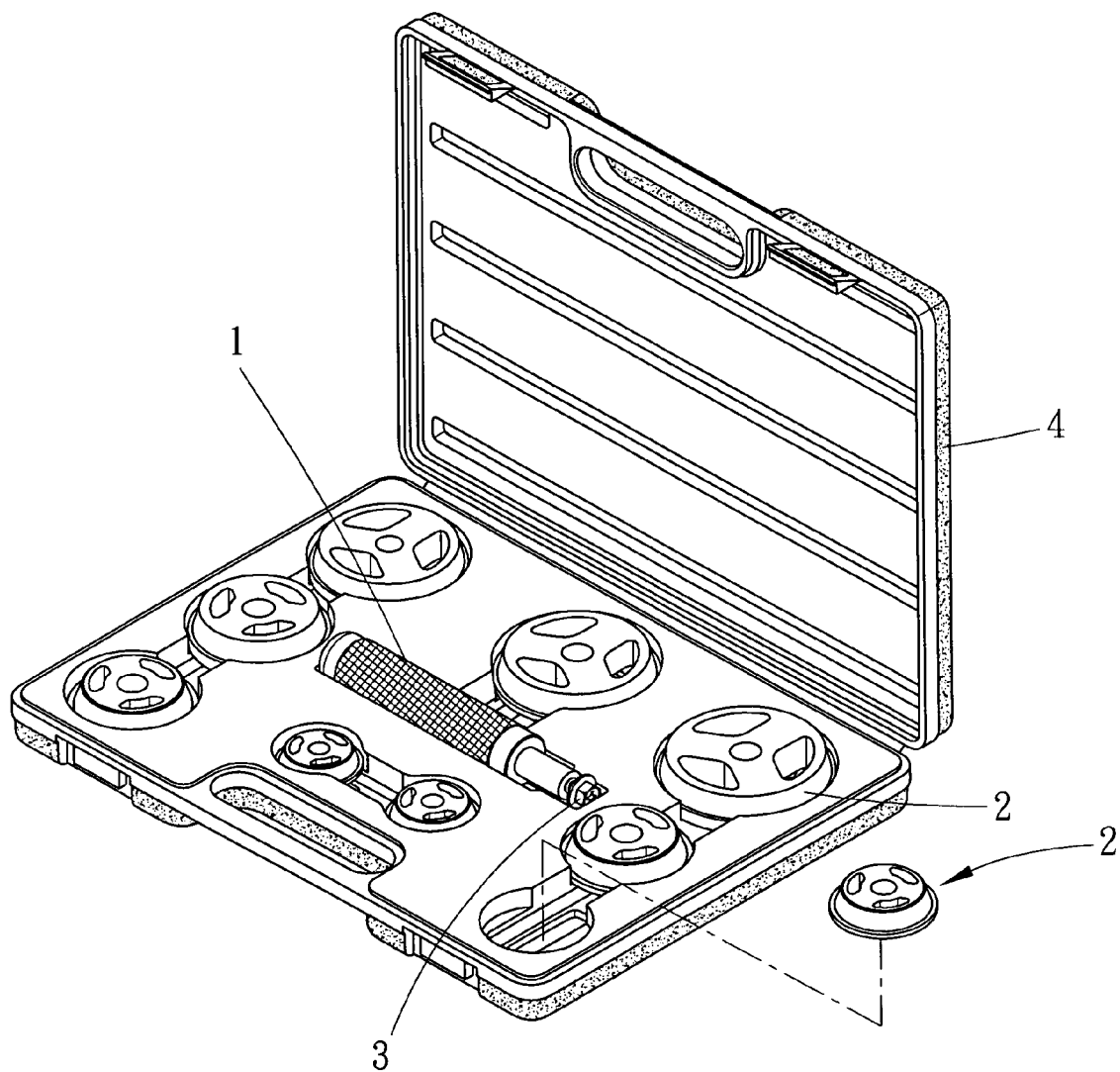
FIG. 6 is a perspective view of a toolbox for depositing and storing the members of the tool set in the present invention.

A preferred embodiment of a bearing positioning tool set in the present invention, as shown in FIGS. 2, 3 and 6, includes a grip 1, one or more positioning press blocks 2, a combining member 3 and a tool box 4 combined together.

The grip 1 has an inner end fixed with a combining rod 10 extending outward and having a combining threaded hole 11 and an outer end formed with a hammering end 12.

The positioning press blocks 2 to be fitted with the grip 1 are respectively formed with different diameters and bored with an insert hole 20 in the center. Further, each positioning press block 2 is formed with a first fitting circular member 21, a first circular holding edge 22, a second circular fitting member 23 and a second circular holding edge 24.

The combining member 3 is to be threadably combined with the combining hole 11 of the grip 1 for fixing the positioning press block 2 in position.

The tool box 4 is used for depositing and storing the above-mentioned members of the tool set.

Figure 4:
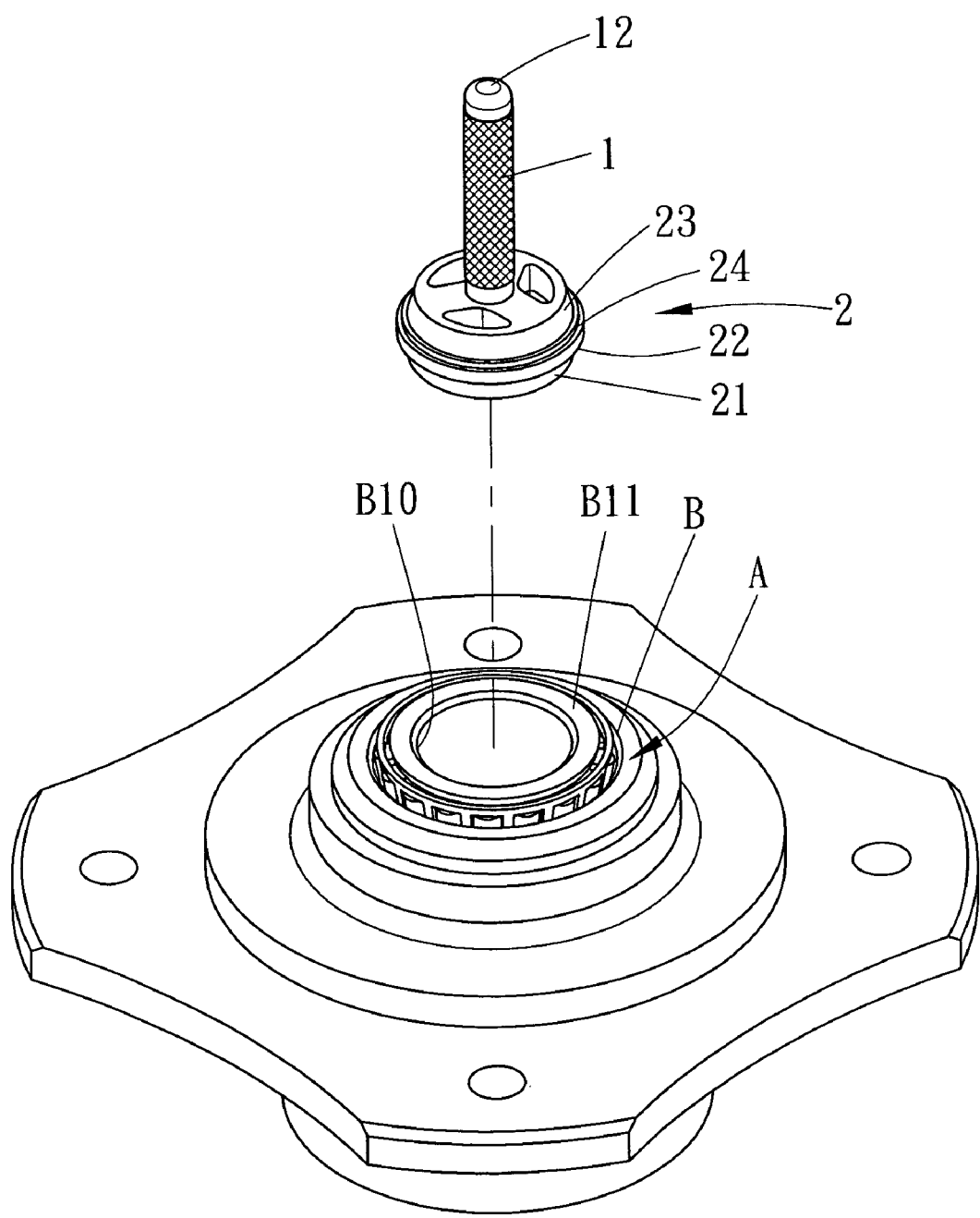
FIG. 4 is a perspective view of the tool set to be hammered for positioning a bearing in the insert hole of an axle in the present invention.
Figure 5:
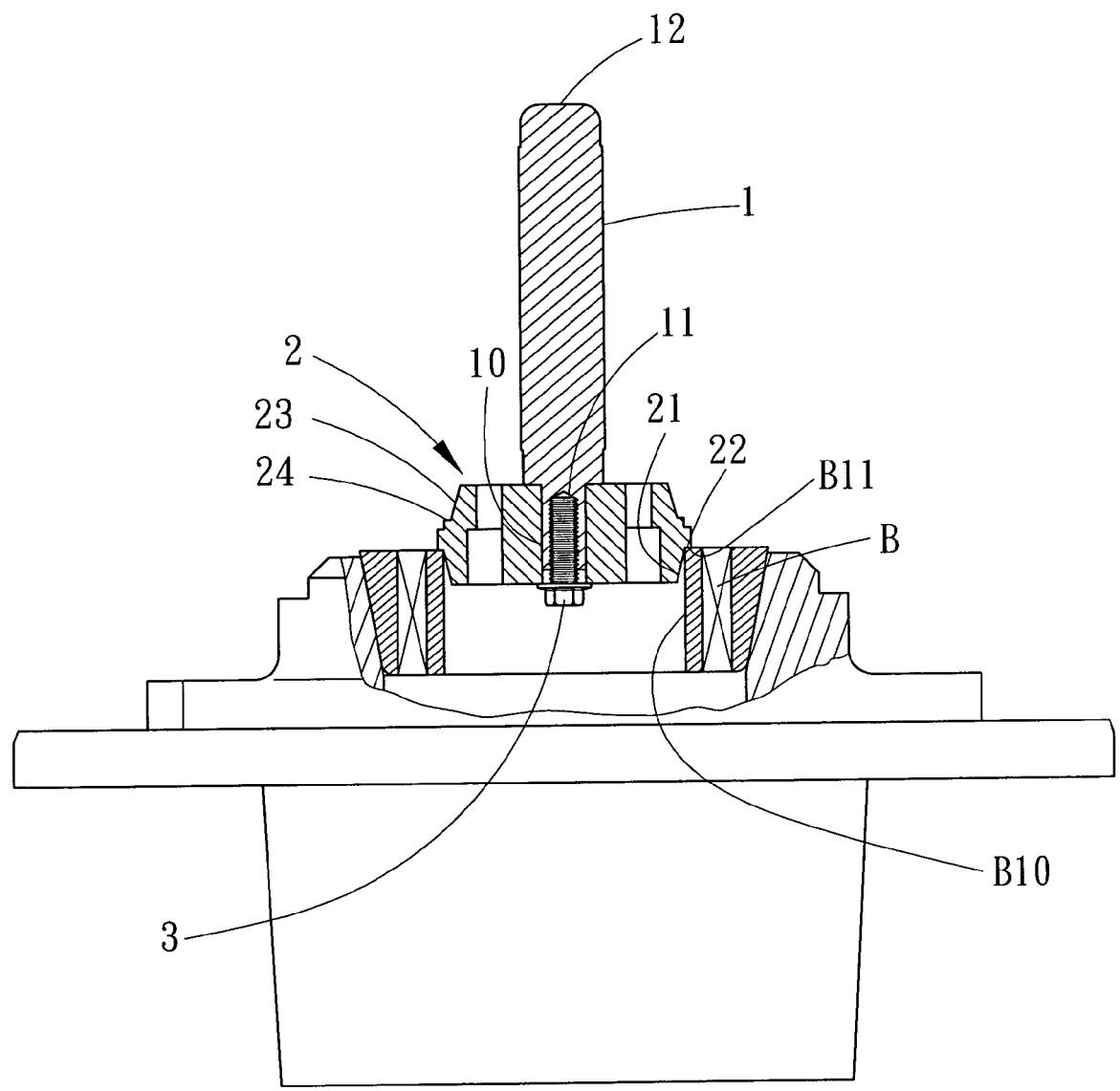
FIG. 5 is a cross-sectional view of the tool set hammered to position the bearing in the insert hole of the axle in the present invention.

In using, as shown in FIGS. 2-5, firstly, pick out a positioning press block 2 with a suitable diameter and circumference according to the size of the inner diameter of a bearing (B) to be assembled. Next, the combining rod 10 of the grip 1 is inserted through the central insert hole 20 of the positioning press block 2 and then the combining member 3 is threadably combined with the combining threaded hole 11 of the grip 1 to fix the positioning press block 2 in position. In operating for positioning the bearing (B), as shown in FIGS. 4 and 5, firstly, the positioning press block 2 has its first fitting member 21 (or the second fitting member 23) closely contacting with the inner wall (B10) of the bearing (B) and its first holding edge 22 (or the second holding edge 24) closely and horizontally resting on the upper edge (B11) of the bearing (B). Next, the bearing (B) is driven into the insert hole (A) of an axle by striking the hammering end 12 of the grip 1 with a hammering tool (C). Thus, since the positioning press block 2 has its first fitting member 21 and its first holding edge 22 respectively and horizontally contacting closely with the inner wall (B10) and the upper edge (B11) of the bearing (B): therefore, the bearing (B) can smoothly and quickly be assembled and positioned in the insert hole (A) of an axle.

As can be understood from the above description, this invention has the following advantages.

1. The fitting member and the holding edge of the positioning press block can respectively contact closely with the inner wall and the upper edge of the bearing; therefore, during assembling, hammering force can be applied evenly and hence the bearing can be smoothly and quickly moved and positioned in the insert hole of an axle.

2. Since hammering force can be applied evenly, the bearing, when being assembled, can be smoothly and horizontally driven into the insert hole of the axle not to slant to any side, able to avoid wear to the inner wall of the insert hole of an axle or preventing the bearing from being damaged due to improper hammering.

3. The tool set of this invention is provided with different-sized positioning press blocks respectively formed with two different diameters for matching with different-sized bearings.

4. This invention is provided with a toolbox for facilitating depositing and storing the members of the tool set.

While the preferred embodiment of the invention has been described above, it will be recognized and understood that various modifications may be made therein and the appended claims are intended to cover all such modifications that may fall within the spirit and scope of the invention.

What is claimed is:

1. A bearing-positioning tool set comprising:

a grip (1) having a hammering end opposite an inner end which is fixed with a combining rod (10) extending outward, said combining rod bored with a combining threaded hole (11);

one positioning press block (2), said positioning press block to be fitted with said grip being bored with an insert hole (20) in a center of said positioning press block, each said positioning press block (2) formed with a first circular fitting member (21), a first circular holding edge (22), a second circular fitting member (23) and a second circular holding edge (24) which are arranged sequentially; wherein said first circular fitting member (21) has a conic shape with a large bottom near said first circular holding edge (22); and said second circular fitting member (23) has a conic shape with a large bottom near said second circular holding edge (24); and said first circular holding edge (22) has an outer diameter greater than that of said first circular fitting member (21) and also greater than that of said second circular fitting member (23); and an outer diameter of said first circular holding edge 22 is greater than that of said second circular holding edge (24); a circular protruding portion is formed between the first circular edge (22) and said second circular holding edge (24);

three through holes formed around said insert hole (20) and formed in said positioning press block (22);

a combining member (3) threadably combined with said combining threaded hole (11) of said grip (1) for fixing said positioning press block (2) in position; and wherein in operation, said combining rod (10) of said grip (1) is inserted through said insert hole (20) of said positioning press block (2) and then said combining member (3) is threadably combined with said combining threaded hole (11) of said grip (1) to fix said positioning press block (2) in position; a bearing is positioned to be assembled in the receiving hole of an axle when one of said first fitting member 21 and said second fitting member 23 closely contacts with an inner wall of said bearing with a respective one of said first holding edge (22) and said second holding edge (23) closely and horizontally resting on an upper edge of said bearing, and then said bearing can be driven into said receiving hole by striking said hammering end (12) of said grip (1) with a hammering tool; therefore, said bearing can smoothly and quickly be assembled and positioned in the receiving hole.

2. The bearing positioning tool set as claimed in claim 1, wherein a toolbox is provided for depositing and storing the members of said tool set.

* * * * *